DONOVAN & FOWLER.
Cotton-Planter.
No. 20,049.
Patented Apr 27, 1858.
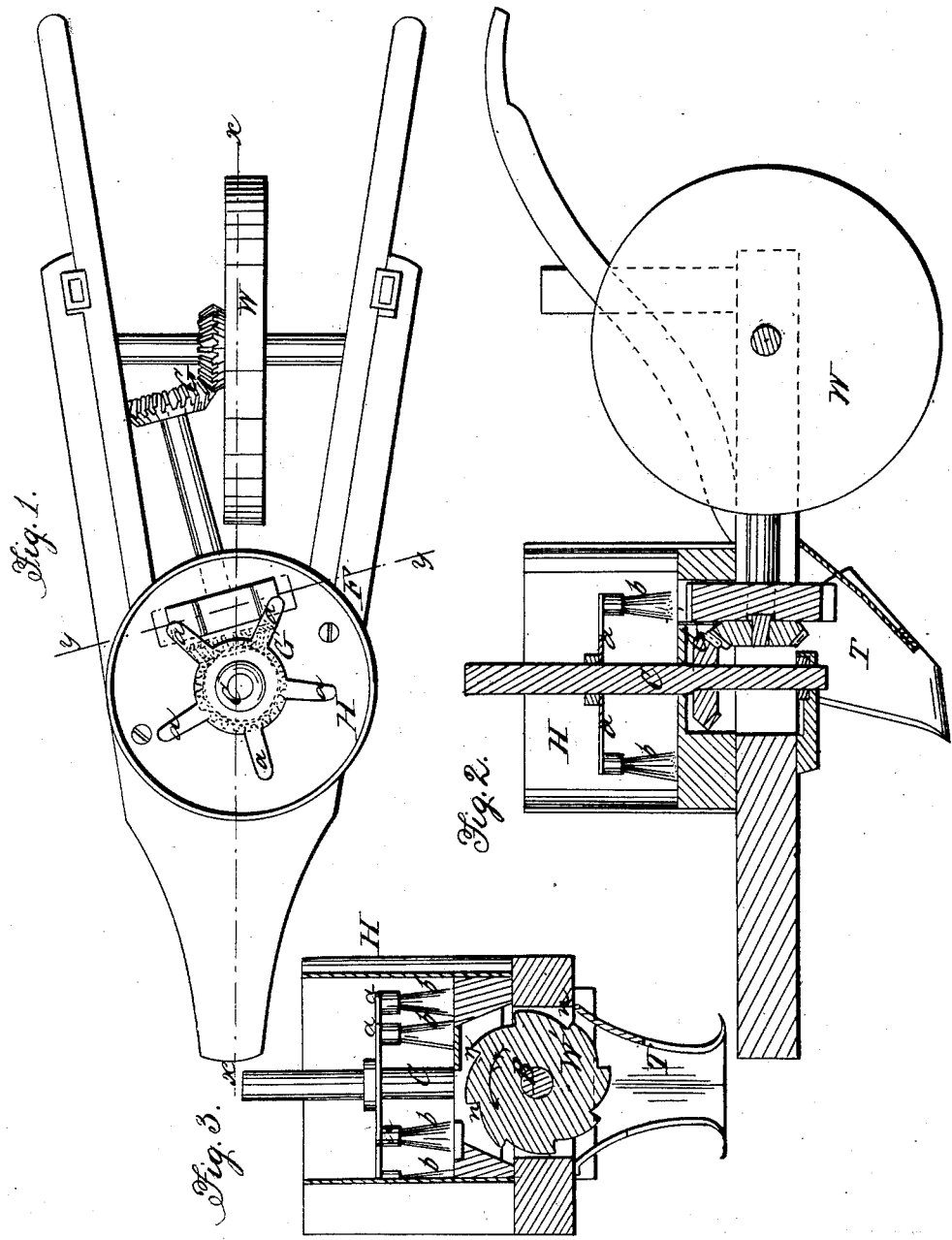

UNITED STATES PATENT OFFICE.

I. T. DONOVAN AND W. J. FOWLER, OF SEGUIN, TEXAS.

IMPROVEMENT IN COTTON-SEED PLANTERS.

Specification forming part of Letters Patent No. 20,049, dated April 27, 1858.

*To all whom it may concern:*

Be it known that we, I. T. DONOVAN and W. J. FOWLER, of Seguin, in the county of Guadalupe and State of Texas, have invented a new and useful Improvement in Cotton-Seed Planters; and we do hereby declare that the following is a full, clear, and exact description of the construction and operation of the same, reference being had to the annexed drawings, forming part of this specification, in which—

Figure 1 is a top view of the implement. Fig. 2 is a vertical section on $x\ x$. Fig. 3 is a vertical section on $y\ y$.

Similar characters of reference in the several figures denote the same parts.

The nature of our invention consists in a peculiar combination of devices, hereinafter to be set forth, for effecting the agitation and discharge of the seed, the details of construction and operation being as follows:

In the drawings, F is the frame, W is the wheel, and H is the hopper. The bottom of the hopper has a slot through which protrudes a toothed wheel, W′, mounted upon a shaft, B, driven by bevel-gear connection seen at G. Running upward through the center of the hopper is a shaft, C, to which is secured a series of arms, $a\ a$, having depending brushes $b\ b$ at their extremities. This shaft is rotated by gear-connection G′, so that the brushes will move in the same direction as the wheel W′.

Below the wheel W′ is the depositing-tube T, constituting the furrow-opener and channel for the passage of the seed. The forward movement of the machine causes the rotation of wheel W′ in direction of arrow, the notches of this wheel catching the seed and conveying it to the tooth T. The rotation of shaft B produces the rotation of the agitating-shaft C, the arms of which loosen the seed and prevent packing, while the depending brushes $b$ insure the filling of the notches $n$ of wheel W′, as the seed will thus be prevented from arching over the wheel W′.

What we claim, and desire to secure by Letters Patent, is—

The combination of notched wheel W′, shaft C, arms $a$, and depending brushes $b$ thereof with the circular hopper, the whole arranged for joint operation, as herein shown and described.

In testimony whereof we have hereunto signed our names before two subscribing witnesses.

W. J. FOWLER.
    I. T. DONOVAN.

Witnesses to signature of W. J. Fowler:
  H. W. MCDANIEL,
  THOS. FOWLER.

Witnesses to signature of I. T. Donovan:
  GEO. PATTEN,
  W. CROSSFIELD.